Dec. 10, 1940.    W. H. WINEMAN    2,224,463
PUMPING APPARATUS
Original Filed March 3, 1937    5 Sheets-Sheet 1
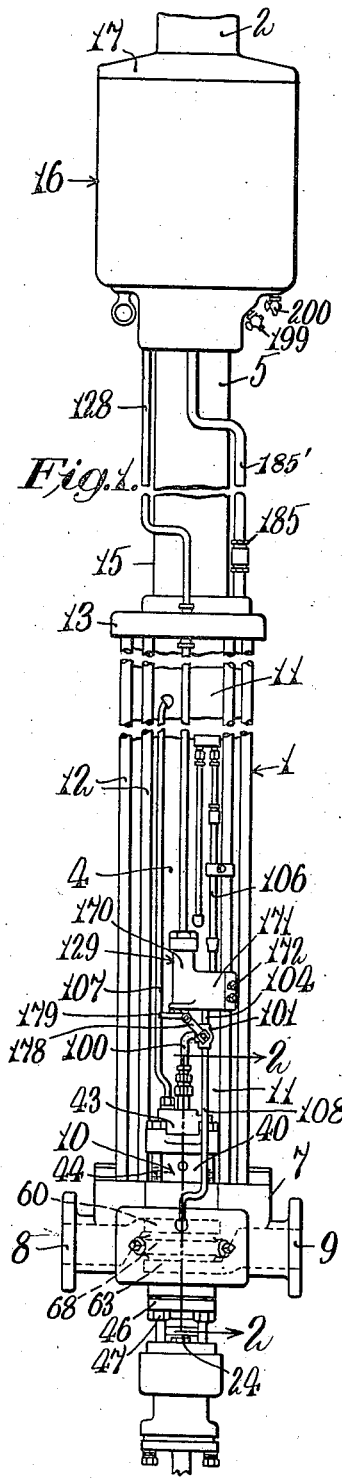
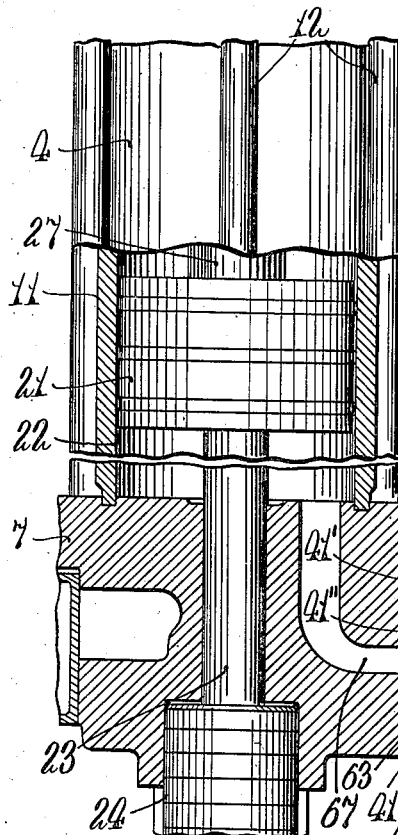
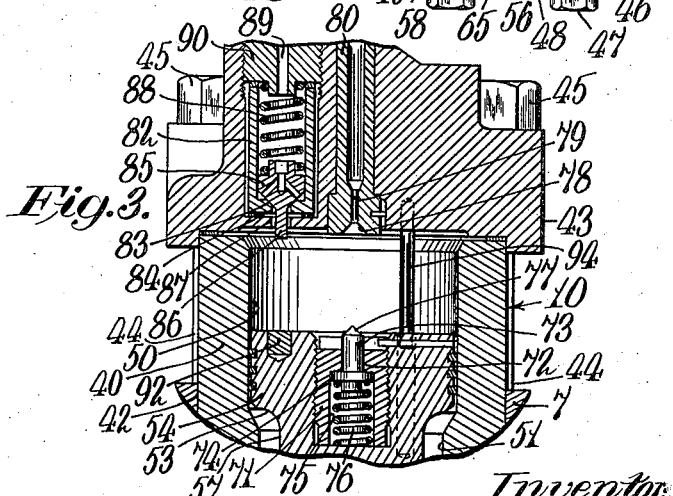
Inventor:
Wade H. Wineman.
by
atty.

Dec. 10, 1940.    W. H. WINEMAN    2,224,463
PUMPING APPARATUS
Original Filed March 3, 1937    5 Sheets-Sheet 2
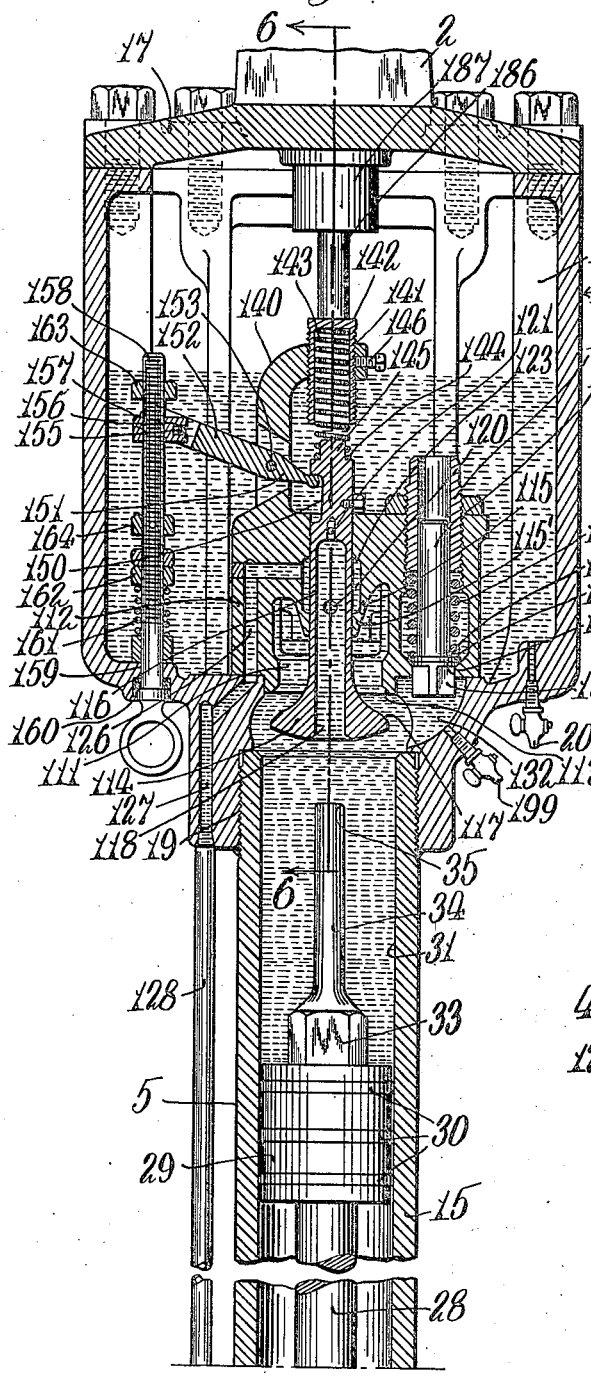
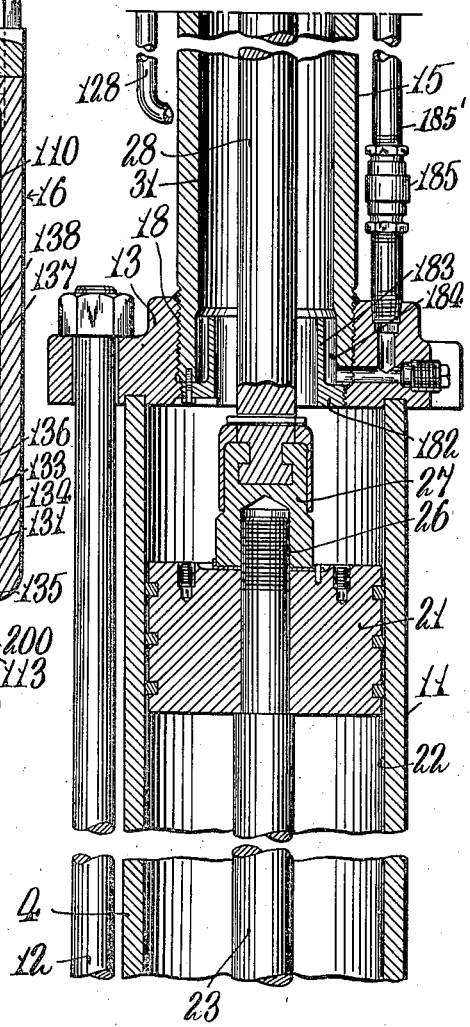
Inventor:
Wade H. Wineman.
by
Louis A. Maxson.
atty.

Dec. 10, 1940.    W. H. WINEMAN    2,224,463
PUMPING APPARATUS
Original Filed March 3, 1937    5 Sheets-Sheet 3
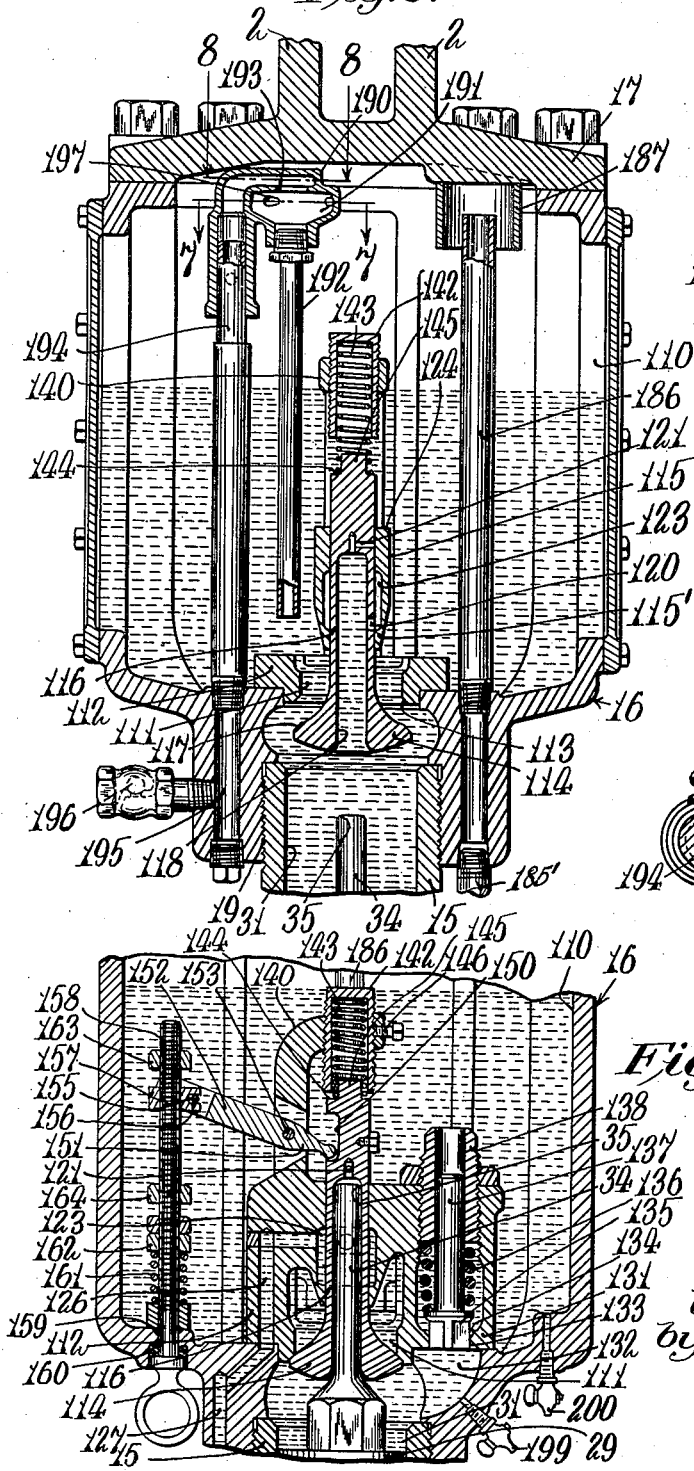
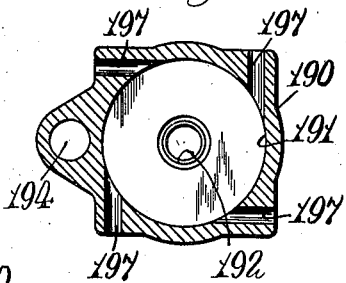
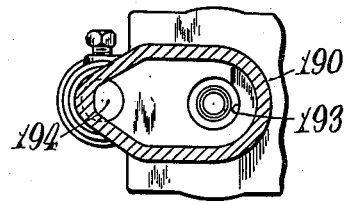
Inventor:
Wade H. Wineman.
by
Louis A. Maxson.
Atty.

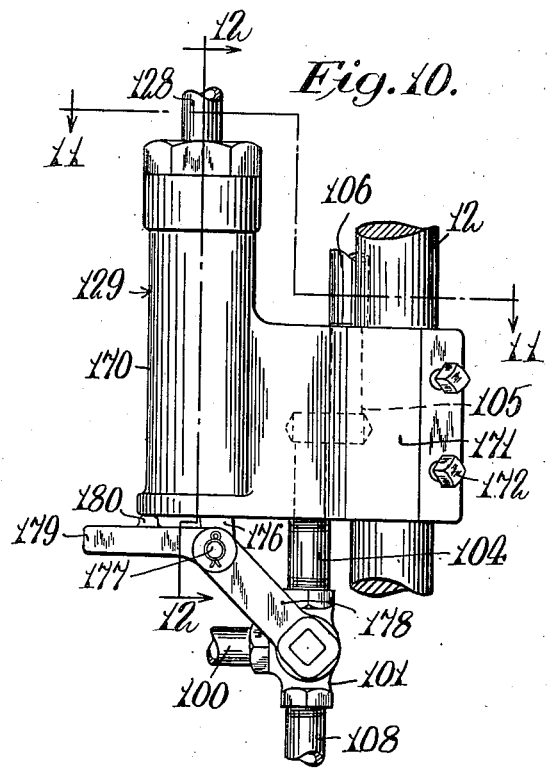
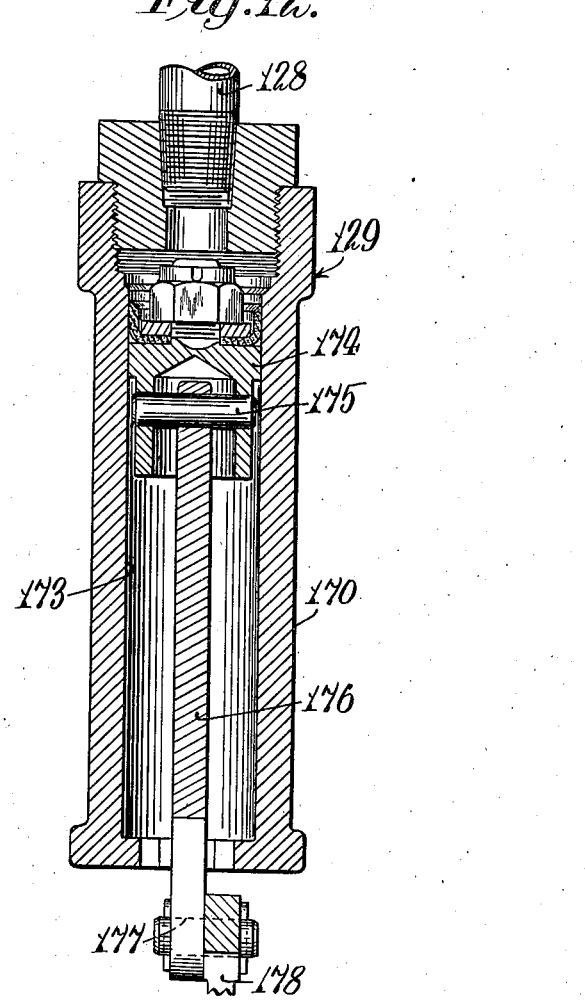
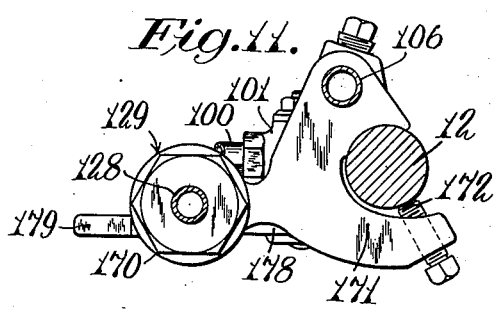
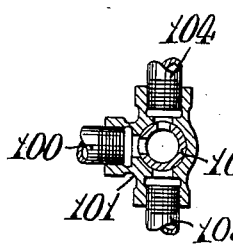

Dec. 10, 1940.    W. H. WINEMAN    2,224,463
PUMPING APPARATUS
Original Filed March 3, 1937    5 Sheets-Sheet 5
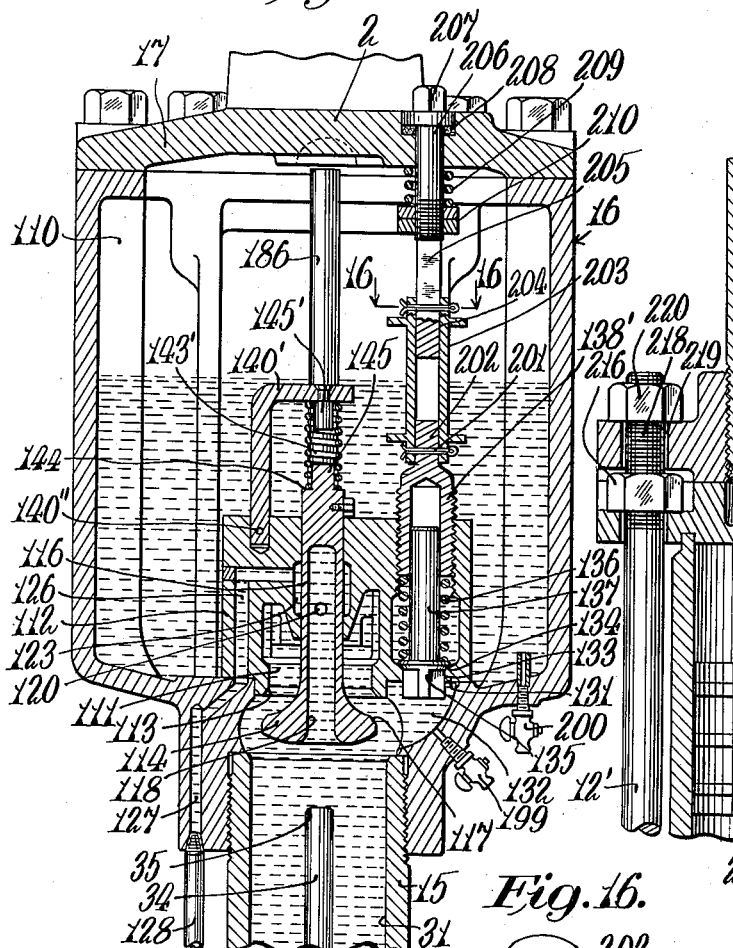
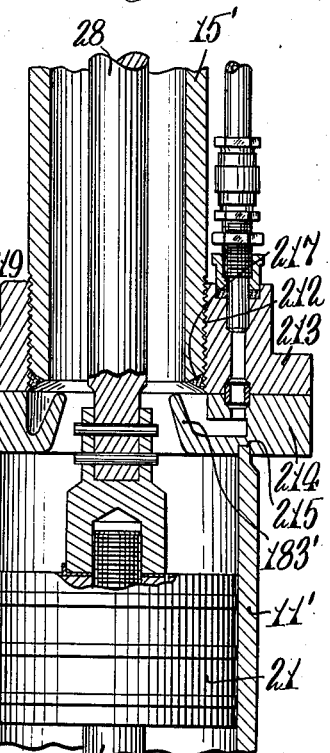
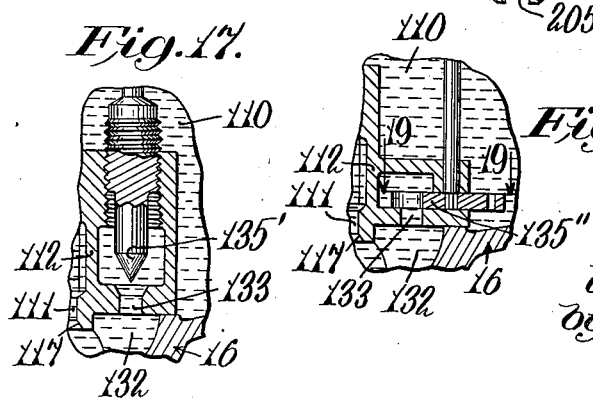
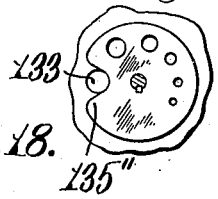
Inventor:
Wade H. Wineman.
by
Louis A. Maxon.
Atty.

Patented Dec. 10, 1940

2,224,463

UNITED STATES PATENT OFFICE 2,224,463

PUMPING APPARATUS

Wade H. Wineman, Michigan City, Ind., assignor to Sullivan Machinery Company, a corporation of Massachusetts Application March 3, 1937, Serial No. 128,826
Renewed December 16, 1939

31 Claims. (Cl. 121—132)

My invention relates to pumping apparatus, and, more particularly, to pumping motors having special equipment and controls adapting them especially to deep well pumping.

In many oil fields, there are wells in which the stratum pressure is insufficient to raise the considerable quantity of oil which is available at such wells to the surface of the ground, and cause its natural flow. Many modes of pumping such wells have been tried, and a very successful one has been developed involving a pressure-fluid-actuated single-acting motor arranged above the surface of the ground and having its piston connected through a pump rod line with a suitable pump in the bottom of the well. Installations of this character are usually made in groups, with a number of pumping motors supplied from a common central source of supply; and compressed air preheated by suitable means adjacent the wells at which it is to be used is a very satisfactory operating medium. The compressed air, after its use in effecting the working strokes of the pump motor pistons, is desirably returned to the compressor intake and maintained at a substantial pressure in the return line so that the downward movements of the pump motor pistons under their own weight and the weight of the pump rod line may be appropriately retarded by the back pressure in the system. Such motors, since they are not ordinarily, for economic reasons, constantly attended by mechanics, must have automatic distributing valve mechanism, and are desirably provided with all possible safeguards to prevent breakage in the event of sudden and radical changes in operating conditions. The pump rod lines are subjected to such stresses, even with this relatively superior system of pumping, that pump rod failures have to be figured on as possible occurrences, in the design of such apparatus, and the rupturing of pump plunger packings is also likely to occur as wear takes place. In the event of either of these occurrences, it is obvious that the loads which the pump pistons move are likely to be suddenly and greatly reduced, and if no means is provided for retarding and cushioning the movements of the suddenly largely unburdened motor pistons, serious damage is likely to occur, both to the rod line and to the pumping motor. It is desirable, also, to interrupt the distribution of operating fluid to the pumping motor when an abnormal event of the character mentioned takes place, to prevent operation thereof abnormally, and it is therefore desirable to provide certainly-effective means for interrupting supply of motive fluid to the pumping motor and holding the fluid distribution valve means in exhaust effecting condition.

With pumping motors of the type mentioned, in view of the presence of more or less gas in the oil being pumped, and since the availability of oil may vary from time to time, it is also necessary to provide for relatively unlimited piston movement, that is to say, to permit piston movement with varying stroke; but it is necessary also to provide a maximum stroke limit and to provide means which will safely check excessive piston travel without injury or dangerous shock and likewise without shutting down the operation of the pumping motor.

Because of its more immediate effectiveness, a liquid displacement type control of pump motor stroke possesses substantial advantages. However, special problems are also introduced by the use of a liquid motion-controlling device, such as the prevention of leakage, the avoidance of the loss of dashpot fluid, the precluding of harmful shocks, etc.

It is an object of my invention to provide an improved pumping motor. It is another object of my invention to provide an improved pumping motor having improved fluid distribution means provided with an improved control. It is a further object of my invention to provide an improved pumping motor having an improved motion-controlling apparatus incorporated therein employing a liquid displaced during the working strokes of the pumping motor. It is still another object of my invention to provide an improved pumping motor having an improved motion-controlling apparatus of the hydraulic type associated therewith, having improved control means permitting substantially unretarded motor piston movement during normal motor operation and providing almost immediately, upon abnormal acceleration of the rate of motor piston movement, for automatic retardation without excessive shock to the pumping system of the pumping motor piston, and desirably also having provision for the automatic locking in exhaust-effecting position of the fluid distribution means as soon as the latter moves to such position, so that the motor shall not make a second working stroke until the derangement is repaired. A further object of my invention is to provide an improved hydraulic motion-controlling device. Yet another object of my invention is to provide an improved hydraulic motion-controlling device having improved means for preventing the loss of liquid therefrom. Yet a further object of my invention is to provide an improved hydraulic controlling device for a pumping motor including means movable both to effect a retardation of piston movement and a cessation of motive fluid supply to the piston. Still another object of my invention is to provide an improved shut down device for a pumping motor operative upon over-speeding of its piston. Other objects and advantages of the invention will hereinafter more fully appear.

In the accompanying drawings, in which one illustrative embodiment of my invention and certain modifications are shown, Fig. 1 is a view, with parts broken out, in side elevation of a portion of a pumping motor and motor-controlling apparatus constructed in accordance with the illustrative embodiment of the invention.

Fig. 2 is a section on an enlarged scale on the plane of the line 2—2 of Fig. 1.

Fig. 3 is a central section on an enlarged scale on a different plane through the upper portion of the distributing valve mechanism illustrated in Fig. 2.

Fig. 4 is a central section through a portion of the hydraulic control devices associated with the pumping motor, showing the upper portions thereof; and Fig. 5 is a view showing the lower portions of this mechanism and the upper portions of the main motor cylinder with the motor piston therein.

Fig. 6 is a central section on a plane at right angles to the plane of Fig. 4, the view taken on the plane of the line 6—6 of Fig. 4.

Fig. 7 and Fig. 8 are respectively horizontal sections on the planes of the lines 7—7 and 8—8 of Fig. 6.

Fig. 9 is a fragmentary sectional view on the same plane as Fig. 4, showing a portion of the mechanism contained in the upper part of Fig. 4 in a different position.

Fig. 10 is a fragmentary view in side elevation showing a portion of the controlling means for moving or holding the fluid distributing valve in exhaust-effecting position.

Fig. 11 is a horizontal section, and Fig. 12 a vertical section, respectively, on the planes of the lines 11—11 and 12—12 of Fig. 10.

Fig. 13 is a sectional view through the three-way valve shown in Fig. 10.

Fig. 14 is a sectional view similar to Fig. 4, showing a modified form of construction.

Fig. 15 is a sectional view similar to Fig. 5, showing details of a modified construction.

Fig. 16 is a section on the plane of the line 16—16 of Fig. 14.

Figs. 17 and 18 are detail sections showing different flow-controlling devices.

Fig. 19 is a horizontal section on the plane of the line 19—19 of Fig. 18.

Referring to the drawings, it may be noted that a pumping apparatus, generally designated 1, is adapted to be suspended in any suitable manner by ears 2, 2 from a tripod or other support, not shown. The pumping apparatus 1 includes an operating or motor cylinder 4, and a hydraulic or motion-controlling cylinder 5. The motor cylinder 4 is provided with a lower head element 7, provided with a fluid supply connection 8 and a fluid discharge connection 9, and having associated therewith a fluid distributing device generally designated 10. The cylinder element proper 11 is clamped by side rods 12 between the lower head 7 and an upper head 13, which supports in coaxial relation to the cylinder 11 a motion-controlling cylinder proper 15, which in turn supports at its top a casing structure generally designated 16, to whose top 17 the ears 2 are herein integrally connected. The cylinder 15 may be appropriately secured to the head 13, and is herein shown as threadedly connected thereto at 18, while it is shown as threadedly connected at 19 to the lower end of the casing 16. Electric welding, or any other suitable means for preventing accidental unscrewing may be used if desired. A motor piston 21 is reciprocable within the bore 22 of the cylinder 11, and is connected by a piston rod 23, extending through a suitable packing 24 downwardly for connection with a pump rod line. Threadedly connected as at 26 to the top of the piston rod 23 is a cap and connector element 27 which provides a connection with the lower end of a piston rod 28 whose upper end carries a piston 29 suitably packed as at 30 and reciprocable in the bore 31 of the hydraulic or motion-controlling cylinder 15. The top of the piston rod 28 carries a combined nut and reduced extension 33, the upper portion 34 of which may be rounded off as at 35.

For simplicity, the fluid distribution means of the operating motor will now be described, in order that the normal mode of operation of this motor may be explained prior to a consideration of the hydraulic control system. The fluid distribution means 10 includes a valve casing 40, preferably shouldered as at 41, 41', 41'', and 41''', and received in a stepped bore 42 formed in the lower cylinder head 7. An upper head 43 is clamped by studs 44 and nuts 45 to the lower cylinder head member 7, and clamps the casing member 40 rigidly in position. A lower head 46 held in position as by the screw devices 47 closes the lower end of the stepped bore 42, and has a central upwardly projecting portion 48 closing the lower end of the stepped bore 49 in the casing element 40. Stepped bore 49 comprises an upper larger bore 50 and a lower, longer, smaller bore 51. Within the bores 50 and 51 is reciprocably mounted a multi-headed piston-type valve 53 having an upper head 54 suitably packed and sliding in the bore 50, an intermediate head 55 suitably packed and sliding in the central portions of the bore 51, and a lower head 56 likewise suitably packed and sliding in the lower portion of the bore 51. Reduced portions 57, 58 lie between the heads 54 and 55 and the heads 55 and 56, respectively. The supply connection 8 communicates with a supply space 60, which opens through radial passages 61 into communication with the bore 51. The exhaust connection 9 communicates with an exhaust groove 63 which communicates through ports 64 with the lower end of the bore 51. The lower end of the casing 40 is not a close fit for the bottom of the stepped bore 42, and so the space surrounding the projection 48 on the head 46 communicates freely with the exhaust space 63, and a passage 65 maintains the same pressure conditions within the lower end of the bore 51—the portion thereof below the valve head 56—that prevail in the exhaust space 63. A port 67 connects the lower end of the cylinder with a space 68 which communicates through a series of radial ports 69 with the bore 51 at a portion thereof between the ports 61 and the ports 64.

It will be evident, from the description so far given, that if the space 63 is maintained under a back pressure, that pressure delivered through the port 65 and acting upon the lower end of the valve head 56 will raise the valve from the position shown in Figs. 2 and 3 to an opposite position thereof, unless the pressure conditions acting upon the top of the valve head 54 prevent this from occurring. In the position of the valve shown in Fig. 2, exhaust from the lower end of the motor cylinder through the port 67, space 68, ports 69, the space in bore 51 surrounding the reduced valve portion 58, ports 64, space 63, and exhaust connection 9, will take place. If the valve 53 be raised to its top position, exhaust will be discontinued and fluid will flow from the supply connection 8 through space 60, ports 61, the space in the bore 51 surrounding the portion 58 of the valve element 53, through ports 69, space 68, and port 67 into the lower end of the cylinder to raise the piston 21 therein.

To control the movements of the distributing valve, means is provided which is fully described in my copending application, Ser. No. 40,949, patented Dec. 26, 1939, No. 2,184,932. For completeness, this means will be described as briefly as possible herein.

The valve element 53 carries centrally of its uppermost portion a member 71 threadedly mounted therein and providing at its upper end a guide 72 for a reduced valve carrying projection 73 formed upon a member 74 which is slidable in a bore 75 within the member 71, and normally maintained projected, as shown in Figs. 2 and 3, by a spring 76. The portion 73 has a conical head 77 which is adapted, in the upper position of the valve, to engage a conical seat 78 which surrounds a passage 79 formed in a member 80 mounted in the upper head 43 of the valve mechanism. The upper head 43 carries a member 82 providing a valve seat 83 surrounding a passage 84, and within the member 82 is slidably mounted a ported valve 85 whose downwardly projecting stem 86 extends through an opening 87 in the lower wall of the head 43 and projects a short distance into the bore 50. A spring 88 normally maintains the valve 85 seated, in which position communication between the passage 87 and a passage 89 in a follower member 90 is cut off. The top head 54 of the valve element 53 carries a hardened block 92 engageable with the valve stem 86 and adapted to unseat the valve 85 when the valve 53 is in its topmost position with the valve element 77 seating upon and sealing fluid flow at the conical seat 78. Accordingly, in the topmost position of the valve 53, flow in either direction through the passage 79 is impossible, while flow through the passage 89 is possible; while in the downward position of the valve 53, flow in either direction through passage 87 is impossible, while flow through the passage 79 is possible. Suitable means 94 is provided to preclude rotation of the valve 53 as it reciprocates, thereby maintaining the block 92 opposite the stem 86.

The passage 79 is connected by a fluid conducting element 100 to a three-way valve casing 101 in which a valve element 102 is rotatably mounted, and in the position of the valve element 102, corresponding to the position shown in Figs. 1, 10, and 13, a connection is made by way of suitable conduit-forming means 104, 105, 106 with a point in the cylinder bore 22 beneath which the top end of the piston 21 moves as the piston 21 approaches the desired lower limit of its travel. The passage 89 is connected by suitable conduit means 107 with a point in the cylinder bore 22 above which the motor piston 21 passes substantially at the desired uppermost limit of travel thereof.

The bottom of the three-way valve casing is connected by a conduit 108 to the supply passage 60.

The mode of operation of the structure so far described will be readily appreciated. In the position of the motor piston 21 shown in Fig. 2, said piston is still moving downward, and its upper end has not yet passed below the point of communication of the connection 106 with the bore 22 of the motor cylinder. When this occurs, the pressure in the chamber 50 above the head 54 of the valve 53, which pressure is approximately the same as working pressure in the cylinder during the working strokes of the motor piston, perhaps 600 pounds per square inch with a motor for use at a deep well, will be vented through the passage 79, 100, three-way valve 101, 102 and fluid conducting means 104, 105, 106 to the space above the piston 21 which is at a relatively low pressure, for reasons which will be hereinafter explained; and the motor back pressure, that is the exhaust line pressure, acting upon the lower end of the valve head 56 will then move the valve 53 into a position to connect the supply space 60 with the port 67 through the annular space surrounding the reduced portion 58 of the valve member 53. The motor piston 21 will thereupon commence its upward travel. Now, if it be noted that when the valve 53 moves to its uppermost position the valve portion 77 seats upon the seat portion 78 and the block 92 engages the stem 86 of the valve 85 and opens the latter, it will be appreciated that though the lower end of the piston 21 soon passes above the point of communication of the conducting means 106 with the motor cylinder, no pressure will be able to pass through the passage 79 to act upon the top of the valve head 54, and only when the piston 21 passes above the point of communication with the cylinder bore 22 of the conducting means 107 will there be a flow of cylinder pressure through the passage 89, through the ported valve 85, and through port 87 into the space above the head 54 of the valve 53. As soon as the pressure through conducting means 107 and passage 89 starts to move the valve 53 downwardly, the valve element 77 unseats, and though the valve 85 promptly seats, the cylinder pressure will then pass through the passage 79 and move the valve 53 to its exhaust-establishing position shown in Fig. 2. Thereafter, since the pressure beneath the piston 21 will promptly reduce to the exhaust line pressure, the piston 21 will move downwardly; and as it moves downward and passes below the point of communication of the passage 107 with the cylinder bore 22, no venting of pressure through passage 89 can take place because the valve 85 is held too firmly to its seat by the spring 88; and only when the piston 21 again reaches the position in which its top head moves below the point of communication with the cylinder bore 22 of the fluid conducting means 106 will the pressure above the head 54 be again vented and the valve 53 move once more to fluid-admitting position. It may be noted, to summarize, that the movements of the valve 53 to fluid-admitting position are caused by the exhaust line pressure acting upon the lower end of the valve. Its movements to exhaust-establishing position are caused by cylinder pressure acting upon its upper larger head. It may be noted, further, that even though during the down-stroke of the piston 21 the pressure above the head 54 of the valve may reduce, due to the fall in pressure beneath the piston 21, the larger area of the head 54 will maintain the valve 53 in its lowered position, because the pressure on 54 cannot fall below the pressure on 56 until after the piston 21 gets below the point of communication of conducting means 106 with the cylinder bore.

For a well in which the motive fluid supplied to the motor is 600 pounds per square inch the back pressure may be of the order of 250 to 300 or more pounds per square inch. The pressure above the piston 21, to which the space above the valve head 54 exhausts, may vary, as later explained, between perhaps ten, or so, pounds gauge and a substantial vacuum.

Now referring more particularly to Figs. 4 to 9, inclusive, it is to be noted that the casing 16 provides a relatively large space 110 therein with which the upper end of the bore 31 of the hydraulic cylinder 15 normally freely communicates through a passage 111 in a member 112 suitably mounted upon the bottom wall of the casing 16. The passage 111 is surrounded by a valve seat 113, and a valve element 114 is guided for reciprocation in a guide 115 which receives and guides the stem 116 of the valve 114, and which is herein formed as a part of the member 112. Valve 114 has a conical seating portion 117 adapted to coact, in the closed, upper position of the valve 114, with the seat 113. Valve 114 is provided with a bore 118 therein which extends also upwardly into its stem, and the valve stem 116 has two passages, respectively numbered 120 and 121, formed therein for establishing communication between the bore 118 and the exterior of the valve stem. The passage 120 extends radially through a wall of the valve stem, and even in the normal open position of the valve is in communication with an annular internal groove 123 formed within the guide-providing member. Normally the conduit 121 is sealed in the open position of the valve 114, but upon predetermined upward movement of the valve element 114, the passage 121 will move above the top surface 124 of the member 112, and establish communication between the bore 118 in the valve and the chamber 110. The passage 121 is considerably smaller than the passage 120, and is arranged at the extreme top of the bore 118. The annular space 123 communicates through appropriate conduit means 126, formed in the member 112, and 127, formed in the casing member 16, with a pipe 128 which leads down to a servo-motor, generally designated 129, whose function will be more fully described shortly. The member 112 provides, in a portion thereof, 131, which communicates through a suitable channel 132 with the bore 31 of the hydraulic cylinder 15, a valve controlled passage 133 surrounded by a valve seat 134 toward which a valve 135 is normally pressed by a spring 136 surrounding the stem 137 of the valve 134 and appropriately loaded by a cylindrical, threaded follower member 138. An upwardly projecting bracket member 140 provides a mounting at 141 for an adjustable spring casing 142, which receives a spring 143 which in turn is engageable with a shoulder 144 surrounding a reduced projection 145 on the stem 116 of the valve element 114. It will be evident that the spring 143 may be adjusted to vary the resistance offered to closing movement of the valve 114, and a suitable lock screw 146 is provided to maintain the parts in the desired adjustment. The valve stem 116 above the passage 121 is provided with a lateral recess 150 which receives the shorter arm 151 of a lever 152, pivoted at 153 in the bracket 140. The outer longer arm of the lever 152 has a pin 155 received in a notch 156 in the adjustable support member 157 mounted upon a threaded adjusting rod 158 supported, as at 159, in the lower wall of the casing 16. A packing 160 surrounds the lower end of the rod 158, and a spring 161 acting upon an adjustable nut 162 holds the rod 158 under adequate tension to prevent leakage. Suitable limit stops 163, 164 control the range of adjustment of the member 157. Member 157, pin 155, lever 152, and notch 150 control the degree of maximum opening of valve 114. The stem 34 mounted upon the upper end of the hydraulic-cylinder piston rod 28 may be noted to be adapted, in positions of maximum upward movement of the motor piston, to enter the bore 118.

Now going back to the servo-motor 129, it will be observed that this includes a cylinder 170 supported by a suitable clamp member 171 in which the conduit means 105 is formed, and clamped as at 172 to one of the side rods 12 of the motor cylinder. Within the cylinder member 170 is a cylinder bore 173 in which a piston 174 is reciprocable. A wrist pin 175 carried by the piston 174 carries a connecting rod or link 176 whose lower end is pivotally connected as at 177 to the operating lever 178 of the valve mechanism 101. A finger 179 is provided to enable a manual return of the valve to the position shown in Figs. 10 and 13; and a stop 180 may be provided of appropriate length to bring the valve to precisely the desired position.

It will be noted, referring to Fig. 5, that there is arranged at the lower side of the cylinder head 13 an annular member 182 having an upwardly projecting annular portion 183 which forms an annular cup-like space 184 within the lower end of the bore 31 of the hydraulic cylinder 15. This annular space is provided to collect any of the fluid which may escape downwardly past the piston 29; and the bottom of the annular space 184 is connected through check valve 185 and conduit means 185' with a pipe 186 which extends upwardly nearly to the top of the chamber 110, and whose uppermost portion is surrounded by a downwardly directed sleeve 187. It will be appreciated that upon the up-strokes of the pistons 21 and 29, there is a substantial reduction in the space between these pistons, with which space, of course, the annular cup 184 is in free communication.

Accordingly, there will be a discharge of pressure through the annular space 184 and through the conduit means 185' and pipe 186 into the chamber 110 upon each working stroke of the motor piston; and any liquid which runs down the cylinder wall of the hydraulic cylinder 15 will be returned automatically to the chamber 110. In order that the gaseous fluid discharged from the space between the pistons may be discharged from the chamber 110, I provide, in this form of my invention, means including a centrifugal separator device 190 having a circular chamber 191 therein with downwardly sloping bottom connected by a conduit 192 with a point well down in the chamber 110. The chamber 191 also communicates through a top opening 193 with a conduit 194 which extends to a passage 195 formed in the lower end of the casing member 16, and which communicates through an outwardly-opening check valve 196 with the atmosphere.

Now, it will be evident, since the chamber 191 is provided with four tangentially arranged inlet passages 197, one in each quadrant, that gaseous fluid, perhaps entraining some of the hydraulic medium, upon entering the chamber 191, will be whirled around within said chamber, and the hydraulic medium will adhere to the walls of the chamber and flow down and discharge through the conduit 192, while the lighter gaseous medium will discharge through the top opening 193, through the conduit 194, passage 195, and past the check valve 196 to the atmosphere. Suitable drain and try-cocks 199 and 200 are disposed at appropriate positions on the walls of the casing member 16.

It will be appreciated that each time the motor piston 21 passes below the cylinder end of connection 106, the amount of pressure fluid that was entrapped in the space within the bore 50 above the head 54 of the distributing valve will be released into the chamber between the pistons 21 and 29, which chamber at that moment will be of maximum volume. When the pistons 21 and 29 are at their extreme upper positions the volume between them will be reduced, say, to one-third its maximum, and so the pressure between them will be sufficient to cause the discharge of the valve-operating fluid past the check valve 185 and to atmosphere past check valve 196. In view of the small volume of air discharged from the distributing valve chamber in each cycle, the pressures within the space between pistons 21 and 29 will range from a substantial vacuum to a few pounds gauge.

The mode of operation of the hydraulic system may now be readily followed. It will be appreciated that the control valve 114 operates on the principle of a hydraulic ram valve. Of course, it will be understood that when the pumping motor is in operation and the piston 29 at its lowermost position, the system will be filled with an appropriate liquid, for example, a good grade of lubricating oil, to the level at least of the point of communication with the chamber 110 controlled by the try-cock 200. It will be appreciated, from what has been previously said, that the motor piston 21, and accordingly the hydraulic piston 29 as well, will be subjected to upward movements of varying length depending upon the conditions in the well and of the fluid being pumped by the pump operated by the motor. Normally, the maximum upward travel of these pistons will leave the piston 29 well short of the position shown even in Fig. 4. So long as the speed of the piston movement does not exceed a predetermined rate, what that rate is being controlled by the setting of the spring 143, upward movements of the pistons 21 and 29 will simply displace fluid through the passage 111 without causing any effective seating tendency of the valve 114, and each down stroke of the pistons 21 and 29 will be attended by a flowing back from the chamber 110 of the hydraulic medium through the passage 111 into the cylinder bore 31.

Now let it be supposed that, upon a start of the up-stroke of the motor piston the pump rod line suddenly ruptures or that the pump packing suddenly springs so large a leak that an excessive rate of upward piston movement takes place. As a result, the piston 29 cannot force the fluid from the cylinder bore 31 through the passage 111 rapidly enough to preclude the building up of a closing pressure on the valve 114 in excess of the resistance offered by the spring 143. Accordingly, the valve 114 will move promptly to its seat 113, and acceleration of the upwardly moving piston 29 will be promptly checked; and the rate of its upward movement will thereafter be controlled by the rate at which the hydraulic medium can be displaced through the then-opened passage 121, and the passage 133, past the valve 135, which will be unseated to the degree permitted by the setting of its spring 136, if the hydraulic pressure is sufficient.

Desirably, the spring 136 will be such, and so adjusted, that when the piston 21 passes above the cylinder end of passage 107—at which time cut-off and release occur, with a large drop of the upwardly acting forces—the valve 135 will be closed by spring 136, and further retardation of piston movement will be governed by the rate of liquid flow through port 121. Of course, if the momentum of the moving system of pistons is very large, the valve 135 may remain open longer or may reopen intermittently.

Not only will the upward movement of the valve 114 result in its own closing, but it will also result in the delivery of fluid through the passage 118 and 120, annular space 123, through the passages 126, 127 and conduit 128, to act upon the top of the piston 174 of the servo-motor 129. Accordingly, piston 174 will move downward, and its connecting rod or link 176 will move the valve 102 to a position in which communication will be established between the conduit 100 and the conduit 108, and conduit 100 will be cut off from communication with conduit 106. Accordingly, valve 53, when moved to exhaust-establishing position, will not be able to move back to its opposite position, for there can be no venting of the fluid from above it to atmosphere, and instead until valve 102 is moved back to the position of Fig. 13, live pressure from the space 60 will act on the top of valve 53.

Though the piston 21, after its upward movement has come to an end, should again move downward, this would not result in a new movement of the distributing valve 53 to an admitting position, and the motor would remain stopped, because line pressure will be maintained on the larger head 54 of the distributing valve, and communication through 106 with the cylinder bore cut off at the valve 101, 102.

Obviously the valve 135 may be considered as merely representative of a large class of devices, such as selected orifices, port-obturating valves or the like, for permitting a restricted escape, and if a continuously open escape means be adopted, this will vary the action in a self-evident manner. In Fig. 17 there is shown at 135' a needle valve, and in Figs. 18 and 19 at 135'' an adjustable plate with orifices also therein, controlling flow through port 133.

Now, if the motor piston should simply make an unduly long stroke, due to lightening of the well, or the like, and so cause the piston 29 to move up into a position in which the projection 34 would enter the bore 118 in the valve 114, it will be appreciated that even though the upward rate of movement of the piston 29 had been so slow as not to create a closing tendency in the valve 114 sufficient to close the latter, said valve would be closed as soon as the projection 34 entered the bore 118. The closing of the valve 114 would then provide the same retarding effect that occurs from a rod break, so far as the checking of the upward movement of the motor piston is concerned, with the exception of the fact that because of the initially slower rate of piston movement, the checking action will be effective much more quickly, and with the further exception that no sufficient quantity of fluid can attain entrance, in view of the position of the stem 34, to the space 123 to cause a shutting down of the motor. Indeed, at the rate of upward movement of the piston 29, the fluid displaced from the bore 118 during the upward movement of the piston 29 can be displaced in large part, if not wholly, through the conduit 121 sufficiently rapidly to avoid the forcing of any substantial fluid into the cylinder bore 173 of the servo-motor 129.

In Figs. 14 and 15 there are shown certain modifications of the construction heretofore described, which may be employed advantageously under certain conditions.

Because of the fact that the rate of fluid displacement, in the event of pump rod line breakage, is so much higher than the maximum rate of fluid displacement during normal pumping motor operation, it is possible to dispense with the adjustability of the spring 143, and, as shown in Fig. 14, to provide a spring 143' which at its upper end engages a pin 145' supported on a bracket member 140' which is suitably supported, as by the pin and socket connection 140", as shown in Fig. 14. The lower end of the spring 143' engages the shoulder 144 surrounding the projection 145 upon the upper end of the valve stem 116, while the upper end of the spring surrounds the pin 145' carried by the bracket 140'.

At times it is highly desirable to be able to adjust the resistance to opening movement of the valve 135 without having to open up the casing 16. In order to provide for this result, I have arranged mechanism for adjusting from outside the casing a threaded element 138' which provides a guide for the stem 137 of the valve 135 and also provides an abutment against which the spring 136 reacts. Such adjusting means may assume various forms, but I have herein shown an arrangement in which there is appropriately secured in non-rotative relation, as at 201, to an upwardly extending shank 202 upon the member 138', a channel-like element 203 which has at 204 a connection, providing for relative sliding, but precluding relative rotation, with an approximately rectangular, downwardly-extending stem 205 secured to an adjusting element 206, whose upper end is formed at 207 for engagement by a wrench or a similar turning device. A suitable packing 208 surrounds the upper end of the element 206; and a spring 209 acting upon nut means 210 keeps the packing under compression sufficiently to preclude leakage. Obviously, by applying a suitable wrench to the upper end 207 of the member 206, the threaded member 138' may be rotated, and thereby caused to vary the pressure upon the spring 136 and change the resistance to opening movement of the valve 135.

Instead of the construction at the junction of the cylinders 11 and 15, and instead of the means for connecting the piston rods 23 and 28, shown in Fig. 5, widely different other structures may be employed. For example, the threaded lower end of the cylinder 15' may be threaded into a bore 212 in a head member 213 while the cup 183' may be formed integral with an upper head member 214, within a groove 215 in which there is received the upper extremity of the cylinder 11'. The side or tension rods 12' may be provided with nuts 216 acting upon the head 214, and drawing the head 214 towards the lower head 7. The lower end of the hydraulic cylinder member 15' may be not only threaded, as previously described, but also welded, as at 217, to the head member 213; and extensions 218 of the side rods 12' may extend through openings 219 in the head member 213 and be fitted with nuts 220, which then hold the heads 213 and 214 securely together in a fluid tight manner. It will be observed that the cup member 183' is herein formed integral with the upper cylinder head member 214. The foregoing detailed modifications are simply illustrative of many changes in construction which might be made without departing from the spirit of my invention or the scope of the appended claims.

From the foregoing description it will be evident that I have provided an improved pumping apparatus in which the pump motor piston is continuously under such close control that no untoward event is likely to result in serious damage to the pumping unit or to the pump rod line; in which in the event of serious rupture of a pump packing or breaking of a pump rod line, the pump operating motor will be cushioned adequately in its upward movement and prevented from making additional working strokes; in which provision is made for cushioning the abnormally long strokes which at times occur during normal pumping operation without stopping the pump operating motor; in which, with the positiveness of operation of a hydraulic dashpot, there is prevented any risk of the device becoming inoperative due to leaking away of the dashpot liquid; and in which adjustment to take care of different operating conditions may be readily made.

While there are in this application specifically described one form and certain modifications which my invention may assume in practice, it will be understood that these are shown for purposes of illustration and that the invention may be further modified and embodied in various other forms without departing from its spirit or the scope of the appended claims.

What I claim as new and desire by Letters Patent is:

1. In combination, a motor cylinder, a hydraulic control cylinder, interconnected pistons in said cylinders whereby movement of the motor piston causes movement of said hydraulic control cylinder piston, said hydraulic control cylinder having a liquid therein displaced on movement of the hydraulic control piston, a valve normally permitting the passage of said liquid during normal rates of piston movement and closeable by liquid flow at an excessive rate, and a loaded escape valve for permitting displacement of liquid at a reduced rate on closure of said first mentioned valve.

2. In combination, a motor cylinder, a hydraulic control cylinder, interconnected pistons in said cylinders whereby movement of the motor piston causes movement of said hydraulic control cylinder piston, said hydraulic control cylinder having a liquid therein displaced on movement of the hydraulic control piston, a valve normally permitting the passage of said liquid during normal rates of piston movement and closeable by liquid flow at an excessive rate, a loaded escape valve for permitting displacement of liquid at a reduced rate on closure of said first mentioned valve, and an auxiliary liquid displacement passage for permitting a further, restricted flow of liquid when said first mentioned valve is closed, said first mentioned valve effecting opening of said auxiliary liquid displacement passage on closure thereof.

3. In combination, a motor cylinder, a hydraulic control cylinder, interconnected pistons in said cylinders whereby movement of the motor piston causes movement of said hydraulic control cylinder piston, said hydraulic control cylinder having a liquid therein displaced on movement of the hydraulic control piston, a valve normally permitting the passage of said liquid during normal rates of piston movement and closable by liquid flow at an excessive rate, an auxiliary liquid displacement passage permitting a restricted flow of liquid when said valve is closed, and means for opening said auxiliary liquid displacement passage when said valve closes.

4. In combination, a motor having a piston and a fluid-actuated distributing valve movable to admission and to exhaust-establishing positions, and means operative substantially immediately upon an excessive rate of travel of the motor piston to supply fluid as soon as said valve moves from its admission-establishing position into its exhaust-establishing position to hold said fluid-actuated valve in exhaust-establishing position.

5. In combination, a motor having a piston and a fluid-actuated distributing valve having throwing passages having ends overrun by said piston, and means operative on an excessive rate of travel of the motor piston between said ends of said throwing passages to alter the connections of one of said throwing passages to effect a continuous supply of pressure fluid thereto, to hold said fluid-actuated valve in exhaust-effecting position upon its attainment to such position.

6. In combination, a motor having a piston and a fluid-actuated distributing valve, and hydraulic means operative on an excessive rate of travel of the motor piston to permit supply of fluid to hold said fluid-actuated valve in exhaust-establishing position when moved to such position.

7. In combination, a motor having a piston and a fluid-actuated distributing valve, and hydraulic means operative on an excessive rate of travel of the motor piston, and including a plunger reciprocable with said piston and displacing liquid and means movable by a portion of the liquid displaced thereby, to supply fluid to hold said fluid-actuated valve in exhaust-establishing position.

8. In combination, a motor having a piston and a distributing valve, and means operative immediately upon travel of the motor piston at an excessive rate to effect a holding of said distributing valve in exhaust-establishing position upon its attainment to such position.

9. In combination, a motor having a piston and a distributing valve, and means operative upon travel of the motor piston at an excessive rate irrespective of its position and including a pressure area and means for effecting pressure supply thereto for holding said distributing valve in exhaust-establishing position upon its attainment to such position.

10. In combination, a motor having a reciprocating piston and a distributing valve, and means operative upon travel of the motor piston at an excessive rate at any portion of its travel to provide a force for holding said distributing valve in exhaust-establishing position as soon as it attains it.

11. In combination, a motor having a reciprocating piston and a distributing valve, and means operative upon travel of the motor piston at an excessive rate at any portion of its travel to transmit a pressure fluid for holding said distributing valve in exhaust-establishing position, as soon as it attains it.

12. In combination, a motor having a piston and a distributing valve, a cylinder having a piston therein operatively connected with the motor piston, said cylinder containing a fluid displaceable upon the working strokes of the motor piston, and means operable by said displaceable fluid upon displacement thereof at a rate above a predetermined maximum for effecting a locking of said distributing valve in exhaust-establishing position upon the occurrence of an excessive motor piston speed at substantially any point in the working stroke of said motor piston.

13. In combination, a motor having a piston and a distributing valve, a cylinder having a piston therein operatively connected with the motor piston, said cylinder containing a displaceable liquid displaced upon the working strokes of the motor piston, and means operable by said displaceable liquid for effecting a locking of said distributing valve in exhaust-establishing position, upon the occurrence of an excessive motor-piston speed.

14. In combination, a motor having a piston and a distributing valve, a cylinder having a piston therein operatively connected with the motor piston, said cylinder containing a displaceable liquid and having means associated therewith permitting said liquid to be displaced upon the working strokes of the motor piston, and means operable by said displaceable liquid for automatically controlling its rate of displacement and for causing locking of said distributing valve in exhaust-establishing position, upon the occurrence of an excessive motor-piston speed.

15. In combination, a motor cylinder, an alined motion-controlling cylinder of smaller diameter than said motor cylinder, pistons in said cylinders respectively, means connecting said pistons for simultaneous movement, a pressure-fluid-actuated distributing valve for said motor cylinder, means for venting throwing pressure for said valve to the space between said pistons, and means for venting pressure from the space between said pistons, said last mentioned venting means having means associated therewith for precluding flow towards the space between said pistons.

16. In combination, a motor cylinder, an alined, superimposed motion-controlling, liquid-dashpot cylinder of smaller diameter than said motor cylinder, pistons in said cylinders respectively, means connecting said pistons for simultaneous movement, a pressure-fluid-actuated distributing valve for said motor cylinder, means for venting throwing pressure for said valve to the space between said pistons, and means for venting pressure from the space between said pistons and returning any dashpot liquid securing entrance to said space.

17. In combination, a motor cylinder, a hydraulic control cylinder, pistons in said cylinders connected for concurrent movement, said cylinders and pistons of such relative diameters that the space between said pistons diminishes on the working strokes of said motor piston, and a check valve controlled vent from said space.

18. In combination, a motor cylinder, a hydraulic control cylinder, pistons in said cylinders connected for concurrent movement, said cylinders and pistons of such relative diameters that the space between said pistons diminishes on the working strokes of said motor piston, a reservoir in communication with said hydraulic control cylinder, and a check-valve-controlled vent leading from said space to said reservoir.

19. In combination, a motor cylinder, a hydraulic control cylinder, pistons in said cylinders connected for concurrent movement, said cylinders and pistons of such relative diameters that the space between said pistons diminishes on the working strokes of said motor piston, and a check valve controlled vent from said space leading to a point in communication with the top of said hydraulic control cylinder.

20. In combination, a motor cylinder, an alined hydraulic control cylinder arranged above said motor cylinder, pistons in said cylinders respectively, means for connecting said pistons so that the motion of the piston in the hydraulic control cylinder accompanies movements of the motor cylinder piston, means at the lower end of the hydraulic control cylinder for collecting any liquid which may escape downwardly past the hydraulic control cylinder piston, and means operated by pressure differentials created by the movements of said pistons for discharging any such leakage and returning it to the space above the hydraulic control cylinder piston.

21. In combination, a motor cylinder, an alined, communicating hydraulic control cylinder arranged above said motor cylinder, pistons in said cylinders respectively, means for connecting said pistons so that the motion of the piston in the hydraulic control cylinder accompanies movements of the motor cylinder piston, means at the lower end of the hydraulic control cylinder for collecting any liquid which may escape downwardly past the hydraulic control cylinder piston, means operated by fluid pressure differentials created by the movements of said pistons for discharging any such leakage and returning it to the space above the hydraulic control cylinder piston, and means for separating the liquid from the fluid which returns it.

22. In combination, a motor cylinder, a piston in said motor cylinder, and means for precluding excessive speeds of said motor piston at any point in the travel thereof, including a hydraulic control cylinder, a piston in the latter operatively connected with said motor piston, means forming a liquid-containing chamber above said hydraulic control cylinder, and means for controlling the discharge into said chamber from said hydraulic control cylinder of a motion-controlling liquid in the latter.

23. In combination, a motor cylinder, a piston in said motor cylinder, and means for precluding excessive speeds of said motor piston at any point in the travel thereof, including a hydraulic control cylinder, a piston in the latter operatively connected with said motor piston, means forming a liquid-containing chamber above said hydraulic control cylinder, and means for controlling the discharge into said chamber from said hydraulic control cylinder of a motion-controlling liquid in the latter including means for automatically varying the flow area in response to displacement rates.

24. In combination, a pump motor cylinder, a piston in said motor cylinder, and means for precluding excessive speeds of said motor piston at any point in the travel thereof, including a hydraulic control cylinder, a piston in the latter operatively connected with said motor piston, a liquid in said control cylinder, and means controlling the displacement of said liquid for precluding excessively high piston speeds and for limiting the extreme travel of the pistons.

25. In combination, a pump motor cylinder, a piston in said motor cylinder, and means for precluding excessive speeds of said motor piston at any point in the travel thereof, including a hydraulic control cylinder, a piston in the latter operatively connected with said motor piston, a liquid in said control cylinder, and a plurality of valves for controlling the displacement of said liquid for precluding excessively high piston speeds and for limiting the extreme travel of the pistons.

26. In combination, a motor cylinder, a hydraulic control cylinder, pistons in said cylinders respectively, means connecting said pistons for concurrent movement, said cylinders and pistons of such relative diameters that the volume between said pistons alters as they move together in their respective cylinders, a distributing valve for said motor cylinder, means for venting operating fluid from said valve to the space between said pistons when said space is a maximum and for discharging fluid from between said pistons when the space between them is a minimum.

27. In combination, a motor cylinder, a hydraulic control cylinder, said cylinders each containing a piston, means for connecting said pistons for concurrent movement, a hydraulic fluid displaceable by the piston in said hydraulic cylinder, a valve controlling the displacement of such fluid, a distributing valve for said motor cylinder, and means operable by displaced fluid when fluid displacement is attendant upon excessively rapid motor piston movement, but not when fluid displacement attends overtravel at normal speeds of the motor piston, for rendering said distributing valve inoperative to maintain the motor piston in operation.

28. In combination, in a pumping apparatus, an element connected to a pump to be actuated, and actuating and controlling means for said element including means for exerting thereon a yielding lifting force and means effective at any point in the working stroke of said element and operative upon an excessive rate of travel thereof, as through loss of load, to preclude unretarded movement of said element.

29. In combination, in a pumping apparatus, an element connected to a pump to be actuated, and actuating and controlling means therefor including means for subjecting said element to the lifting action of a body of gaseous fluid under pressure, and means operative at any point in the working stroke of said element, upon excessively rapid movement of the latter, to preclude a reapplication of the lifting action of such gaseous pressure on said element.

30. In combination, in a pumping apparatus, an element connected to a pump to be actuated, and actuating and controlling means therefor including means for supplying to one side of said element a gaseous fluid under pressure, means operative at a predetermined point in the working stroke of said element for cutting off the supply of pressure fluid to said element, and means operative at any point in the working stroke of said element upon an excessive rate of travel thereof for effecting a holding of said supply-cutting-off means in cut-off position after attainment to such position.

31. In combination, a motor having a piston having for a given set of conditions an approximately uniform stroke, said motor also having a distributing valve, and means operative upon an excessive rate of travel of said piston at any point in the direction of its working stroke to effect holding of said valve in exhaust establishing position.

WADE H. WINEMAN.